3,661,982
DICARBOXYLIC ACID SALTS OF TRANS, TRANS 4,4'-DIAMINODICYCLOHEXYLMETHANE
Geoffrey Ernest Beswick, Manchester, England, assignor to Imperial Chemical Industries Limited, London, England
No Drawing. Filed May 17, 1968, Ser. No. 729,908
Claims priority, application Great Britain, May 24, 1967, 24,185/67; Mar. 18, 1968, 13,012/68
Int. Cl. C07c *87/14*
U.S. Cl. 260—501.2    5 Claims

ABSTRACT OF THE DISCLOSURE

Process for the separation of trans-trans rich salts of 4,4'-diaminodicyclohexylmethane and dicarboxylic acid by their preferential insolubility in methanol or benzyl alcohol over similar salts of the other geometrical isomers of 4,4' - diaminodicyclohexylmethane. Regeneration of trans-trans enriched 4,4' - diaminodicyclohexylmethane therefrom. The salts especially the dodecanedioic acid salt may be used for the manufacture of polyamides. Other solvents may be used in conjunction with methanol or benzyl alcohol.

---

The present invention relates to the separation of the geometrical isomers of 4,4'-diaminodicyclohexylmethane in particular to the separation of trans-trans isomer rich mixtures from mixtures of such geometrical isomers.

4,4'-diaminodicyclohexylmethane is a well known compound which exists in three geometrical isomeric forms, the cis-cis, cis-trans and trans-trans. It is often referred to by the abbreviation PACM and will be so referred to hereinafter in this specification for the sake of convenience.

PACM is normally made by catalytic hydrogenation of 4,4' - diaminodiphenylmethane using a variety of catalysts, for example ruthenium and its compounds, and is obtained as a semi-solid mixture of the three geometrical isomers. The mixture may contain approximately 50% of the trans-trans isomer, the remainder being the cis-trans isomer together with a small proportion, generally not more than 10%, of the cis-cis isomer.

The trans-trans isomer of PACM is a valuable intermediate for the manufacture of polymers and on account of the geometrical configuration of that isomer is especially useful in the manufacture of polyamides suitable for the manufacture of synthetic fibres.

Methods of separating the geometrical isomers of PACM, for example by crystallisation from solvents have already been proposed but an appreciable proportion of the trans-trans isomer always remains in the cis-cis, cis-trans mixture.

We have now found that a mixture of isomers having an increased trans-trans content can be obtained from a mixture of the geometrical isomers of PACM by forming salts of a mixture of PACM isomers with dicarboxylic acids in either methanol or benzyl alcohol, the salts of the trans-trans isomers being preferentially precipitated. The trans-trans rich precipitated salts are collected for example, by filtration and may be decomposed to give PACM having an increased content of the trans-trans isomer. We have found that in certain cases, for example using dodecanedioic acid, it is possible to obtain a practically pure trans-trans isomer.

Thus according to the present invention there is provided a process for separating from a mixture of the geometrical isomers of 4,4'-diaminodicyclohexylmethane, salts of isomers of increased trans-trans content, which comprises forming a salt of the 4,4'-diaminodicyclohexylmethane with a dicarboxylic acid in methanol or benzyl alcohol as solvent, and separating the precipitated trans-trans rich salt by physical means. The free 4,4'-diaminodicyclohexyl methane may be regenerated from the separated salt if desired.

Mixtures of geometrical isomers of PACM to which the present process may be applied may be formed in any way, for example by reduction of 4,4'-diaminodiphenylmethane. The proportions of the various isomers in a mixture thereof can be approximately determined from the melting point of the mixture or by the application of the technique of nuclear magnetic resonance. Thus it is possible to determine the amount of trans-trans isomer present before and after the separation process has been applied and to determine how much of the available trans-trans isomer has been separated.

Any dicarboxylic acid may be used in the present process although aliphatic dicarboxylic acids are preferred.

Examples of dicarboxylic acids include $\alpha,\omega$ - decanedioic acid, $\alpha,\omega$-dodecanedioic acid, succinic acid, azelaic acid, glutaric acid and adipic acid.

A preferred aliphatic dicarboxylic acid is $\alpha,\omega$-dodecanedioic acid; with this acid it has been found possible to separate the majority of the trans-trans isomer from an isomer mixture while leaving the majority of the cis-cis and cis-trans isomers behind.

This particular acid is thus more selective in its action than the other acids and can be used not merely to separate isomers of increased trans-trans content but to produce practically pure trans-trans PACM. Trans-trans PACM of this quality has not heretofore been obtainable by practicable methods of separation.

It is an essential feature of our process that it should be carried out in methanol or benzyl alcohol as solvent. It is not, however, essential to use methanol or benzyl alcohol as the sole solvent; mixtures of methanol or benzyl alcohol with other solvents may be used providing that the solvent mixture is mainly methanol or benzyl alcohol with minor amounts of other solvents. Solvents which may be used in minor amounts include water, ethanol, isopropanol, toluene, carbon tetrachloride, petroleum hydrocarbons and ethers such as di-n-butyl ether. Solvents other than methanol and benzyl alcohol are preferably used in amounts of less than 25% of the total solvent used. It will be obvious to one skilled in the art that the best amount to use will vary with the different solvents. Mixtures of benzyl alcohol and methanol may also be used.

Although either methanol or benzyl alcohol can be used in the present process, methanol is preferred.

The persent process may conveniently be carried out by dissolving PACM in methanol or benzyl alcohol and mixing that solution with a solution of the dicarboxylic acid in methanol or benzyl alcohol, the mixture is then stirred for a time, cooled and the precipitated salt removed, for example by filtration or centrifuging.

The temperature at which the solutions are mixed is not necessarily critical; the temperature at which the precipitated salt is removed is dependent to some extent on the particular acid employed, thus when using an acid giving rise to a trans-trans salt of greater solubility, the temperature of filtration may need to be lower than when using an acid giving rise to a trans-trans salt of low solubility. When $\alpha,\omega$-dodecanedioic acid is used it has been found convenient to remove the trans-trans salt at ambient temperature.

If desired the free base may then be regenerated from the salt by treatment with a base, such as an alkali hydroxide.

The amount of methanol or benzyl alcohol to be used will obviously vary according to the particular acid used and may also be varied according to whether practically pure trans-trans isomer is required or whether it is merely desired to enrich the trans-trans component of the isomer mixture.

It is obviously essential to use at least 1 molar equivalent of salt it is desired to precipitate and when practically pure trans-trans PACM is required it is essential to use at least one molar equivalent of acid for each molar equivalent of trans-trans isomer present in the original mixture of isomers.

The present process may be used either for the separation of the practically pure trans-trans isomer of PACM or for separating out a mixture of isomers enriched in regard to the trans-trans isomer. After separation of the practically pure trans-trans or the trans-trans enriched material from the methanol or benzyl alcohol, the methanol or benzyl alcohol liquors can be further treated to regenerate PACM having an increased cis-trans content. When pure trans-trans isomer has been separated it is possible by this extension of the present process to obtain a further product which is essentially the cis-trans isomer.

The trans-trans enriched salt produced by the process of the present invention may be used as an intermediate for the manufacture of polyamides, that is, it may be converted by heating to a polyamide containing recurring structural units of the formula $$\left[-CO(CH_2)_{10}-CO-NH-CH\begin{matrix}CH_2-CH_2\\ \\ CH_2-CH_2\end{matrix}CH-CH_2-CH\begin{matrix}CH_2-CH_2\\ \\ CH_2-CH_2\end{matrix}CH-NH-\right]$$

wherein the diaminodicyclohexylmethane moiety is mainly the trans-trans isomer. Alternatively, the trans-trans enriched free amine may be regenerated and used in the preparation of polyamides by reacting with dicarboxylic acids or amide-forming derivatives thereof. In the formula above the dodecanedioic acid salt has been used as an example, polymers containing other structural units will be obtained with salts of other acids.

The trans-trans enriched free amine may also be converted to the corresponding diisocyanate by phosgenation and the diisocyanate may then be used in the manufacture of polyurethanes.

Both the polyamides and polyurethanes referred to above have valuable fibre-forming properties which are enhanced by the enrichment of the trans-trans isomer in the dicyclohexylmethane moiety.

The invention is illustrated but not limited by the following examples in which all parts and percentages are by weight except where otherwise stated.

EXAMPLE 1

21 parts of a mixture of the geometrical isomers of PACM of crystallising point 31° C. and containing approximately 35% of the trans-trans isomer, were dissolved in methanol (40 parts). This solution was added with stirring to a solution of dodecanedioic acid (23 parts) in methanol (184 parts) at a temperature of 35–40° C. The mixture was stirred for an hour then cooled to 10° C. and the precipitated white solid filtered off and dried at 70–75° C. This solid trans-trans 4:4'-diaminodicyclohexylmethane dodecanedioate was obtained in an amount (15 parts) corresponding to 34% theory based on the weight of PACM.

A sample of the trans-trans salt was suspended in water and sodium hydroxide added to liberate the free base which was extracted with chloroform. After evaporating the chloroform, trans-trans PACM remained; this was shown to be at least 93% strength as trans-trans isomer by N.M.R. examination.

EXAMPLE 2

210 parts of PACM, crystallising point 37.9° C. and containing approximately 44% trans-trans isomer, were dissolved in methanol (400 parts). This solution was added with stirring over 10 minutes to a solution of dodecanedioic acid (230 parts) in methanol (800 parts) at 50° C. The trans-trans PACM dodecanedioate, which crystallised out on cooling, was filtered off and dried to give 187 parts of salt equal to 42.5% theory based on PACM. The trans-trans isomer was regenerated as in Example 1.

A portion of the methanol filtrates was evaporated until the cis-trans PACM dodecanedioate crystallised out. This was filtered off, dried, and then suspended in water, sodium hydroxide added and the liberated base extracted with chloroform. The chloroform was then evaporated to give essentially cis-trans PACM; N.M.R. examination indicated the absence of the trans-trans isomer.

EXAMPLE 3

To a solution of decanedioic acid 14.06 parts in methanol 70 parts, was added a solution of 4:4'-diaminodicyclohexylmethane—i.e.—PACM (of trans-trans isomer content 65%) 14.7 parts, in methanol 50 parts, at a temperature of 35° C. After cooling to 10–15° C. the precipitated PACM decanedioate was filtered off, washed with a little methanol and dried.

Yield 20.2 parts (70% theory).

A sample of this PACM 10 salt was decomposed by aqueous sodium hydroxide and the total PACM extracted by chloroform. Examination of the chloroform solution by N.M.R. showed the trans-trans content of the PACM to be 77%.

EXAMPLE 4

A solution of PACM (containing 42% trans-trans isomer) 8.4 parts, in methanol 16 parts, was mixed with a solution of adipic acid 5.8 parts, in methanol 46 parts, at 40° C. and allowed to stand. There were slowly deposited crystals of PACM adipate. These were filtered off and dried.

Yield 7.4 parts (52% of theory).

The PACM adipic acid salt was decomposed by aqueous sodium hydroxide and the total PACM extracted by chloroform. Examination of the solution by N.M.R. showed the trans-trans content of the PACM to be 80%.

EXAMPLE 5

A mixture of 23 parts dodecanedioic acid in 240 parts benzyl alcohol was heated to 50° C. to form a solution. To this was added a heated solution of 21 parts PACM (containing about 34% trans-trans isomer) in 55 parts benzyl alcohol. There was a spontaneous rise in temperature and on cooling to 10° C., the precipitated PACM dodecanedioate was filtered off, washed with ethanol and dried, giving 18.6 parts of PACM dodecanedioate = 42.3% theory based on the total PACM charged.

When the PACM was regenerated from this PACM dodecanedioate by basification and chloroform extraction it was found to contain at least 83% trans-trans isomer by N.M.R. analysis.

EXAMPLE 6

In an experiment carried out in a similar manner to Example 5 above but using PACM containing about 48% trans-trans isomer, the yield of PACM dodecanedioate was 47.6% of theory. The PACM was removed by basification and solvent extraction and found to contain at least 95% trans-trans isomer by N.M.R. analysis.

EXAMPLE 7

A solution of dodecanedioic acid (23 parts) in a mixture of isopropanol 10%/methanol 90% was heated to 50° C. and a solution of PACM (21 parts) containing 45% trans-trans isomer, in a mixture of isopropanol 10%/methanol 90% added. The mixture was maintained at 50°–55° C. for 1½ hours and then cooled to 20° C. and the precipitated PACM dodecanedioic acid salt filtered off and dried (20.3 parts).

A sample of this salt was decomposed by aqueous alkali and the PACM recovered by extraction with chloroform. The PACM thus obtained was found to contain at least 95% trans-trans isomer by nuclear magnetic resonance examination.

EXAMPLE 8

Example 7 was repeated using as the solvent a mixture of isopropanol 20%/methanol 80%. A sample of PACM isolated from the salt obtained was found to comprise at least 92% trans-trans isomer according to the nuclear magnetic resonance spectrum.

EXAMPLE 9

To a solution of dodecanedioic acid (23 parts) in a mixed solvent consisting of methanol 95%, water 5% (240 parts) at 50° C., was added a solution of PACM (21 parts) (containing approximately 48% trans-trans isomer) in the same mixed solvent (40 parts). After holding the mixture at 50–55° C. for 1 hour the solution was cooled to room temperature, the solid filtered off and dried to give 17.6 parts (40% theory) of the PACM dodecanedioic acid salt. A sample of this salt was decomposed by aqueous caustic soda and the liberated PACM extracted into chloroform. This was found to consist of at least 97% trans-trans isomer.

EXAMPLE 10

The process of Example 9 was repeated on the same scale using as solvent a mixture of methanol 90% and water 10%, the yield of salt was 16.5 parts and a sample of PACM isolated therefrom was found to contain 97% trans-trans isomer.

EXAMPLE 11

The process of Example 9 was repeated on the same scale using as solvent a mixture of methanol 50% and benzyl alcohol 50%, the yield of salt obtained was 18.5 parts and a sample of PACM isolated therefrom contained at least 97% trans-trans isomer.

In all the above examples the salt is formed in the particular solvent used. It will be understood that the present invention also covers the separation of trans-trans rich salts from mixtures of preformed salts. That is a mixture of salts of the geometrical isomers of 4,4'-diaminodicyclohexylmethane with a dicarboxylic acid may be dissolved in heated methanol or benzyl alcohol, the solution cooled and the precipitated trans-trans rich salt separated, for example by filtration.

A process in which the salt is formed in situ, in the methanol or benzyl alcohol, with other added solvent as desired, is preferred as it is more convenient and obviates the additional separate step of pre-forming the salt.

EXAMPLE 12

A salt of the mixed isomers of PACM (21 parts) with dodecanedioic acid (23 parts) was made by heating the two components together in ethyl alcohol and then removing the solvent.

The salt was dissolved in methanol (220 parts) at 35–40° C., the solution cooled to 10° C. and the precipitated trans-trans rich salt filtered off and dried.

What I claim is:

1. Process for separating a mixture of isomers having an increased trans-trans content from a mixture of the geometrical isomers of 4,4'-diaminodicyclohexylmethane consisting essentially of 34–65% by weight of the trans-trans isomer and balance cis-trans and cis-cis isomers, which comprises forming a salt of the 4,4'-diaminodicyclohexylmethane with an $\alpha,\omega$-polymethylene dicarboxylic acid having 4 to 12 carbon atoms in a solvent consisting essentially of a member of the group consisting of methanol, benzyl alcohol, mixtures thereof and mixtures thereof with another solvent selected from the group consisting of water, ethanol, isopropanol, toluene, carbon tetrachloride, petroleum hydrocarbons and ethers, said other solvent not exceeding 25% of the total solvent and separating precipitated trans-trans rich salt.

2. Process for the separation of a mixture of isomers having an increased trans-trans content from mixtures of the geometrical isomers of salts of 4,4'-diaminodicyclohexylmethane consisting essentially of 34–65% by weight of the trans-trans isomer and balance cis-trans and cis-cis isomers, with an $\alpha,\omega$-polymethylene dicarboxylic acid having 4 to 12 carbon atoms, salts of increased trans-trans content, comprising dissolving the mixed salts in heated methanol or benzyl alcohol, and cooling the solution and separating the precipitated trans-trans rich salt.

3. A process as claimed in claim 1 wherein the polymethylene dicarboxylic acid is $\alpha,\omega$-dodecanedioic acid.

4. A process as claimed in claim 1 wherein methanol is used.

5. A process as claimed in claim 3 wherein the precipitated trans-trans rich salt is removed at ambient temperature.

References Cited

UNITED STATES PATENTS

| | | | |
|---|---|---|---|
| 3,476,713 | 11/1969 | Dorsey | 260—501.2 |
| 3,502,624 | 3/1970 | Flack et al. | 260—501.2 X |

FOREIGN PATENTS

| | | |
|---|---|---|
| 1,517,499 | 5/1968 | France. |

OTHER REFERENCES

Vogel: A textbook of Practical Organic Chemistry, 3rd edition, John Wiley & Sons, New York, N.Y., pp. 122–28 (1962).

LEON ZITVER, Primary Examiner

M. W. GLYNN, Assistant Examiner

U.S. Cl. X.R.

260—78 R, 563 B